Jan. 12, 1926.
W. H. COSTELLO
1,569,651
GOVERNING DEVICE
Filed Sept. 1, 1921
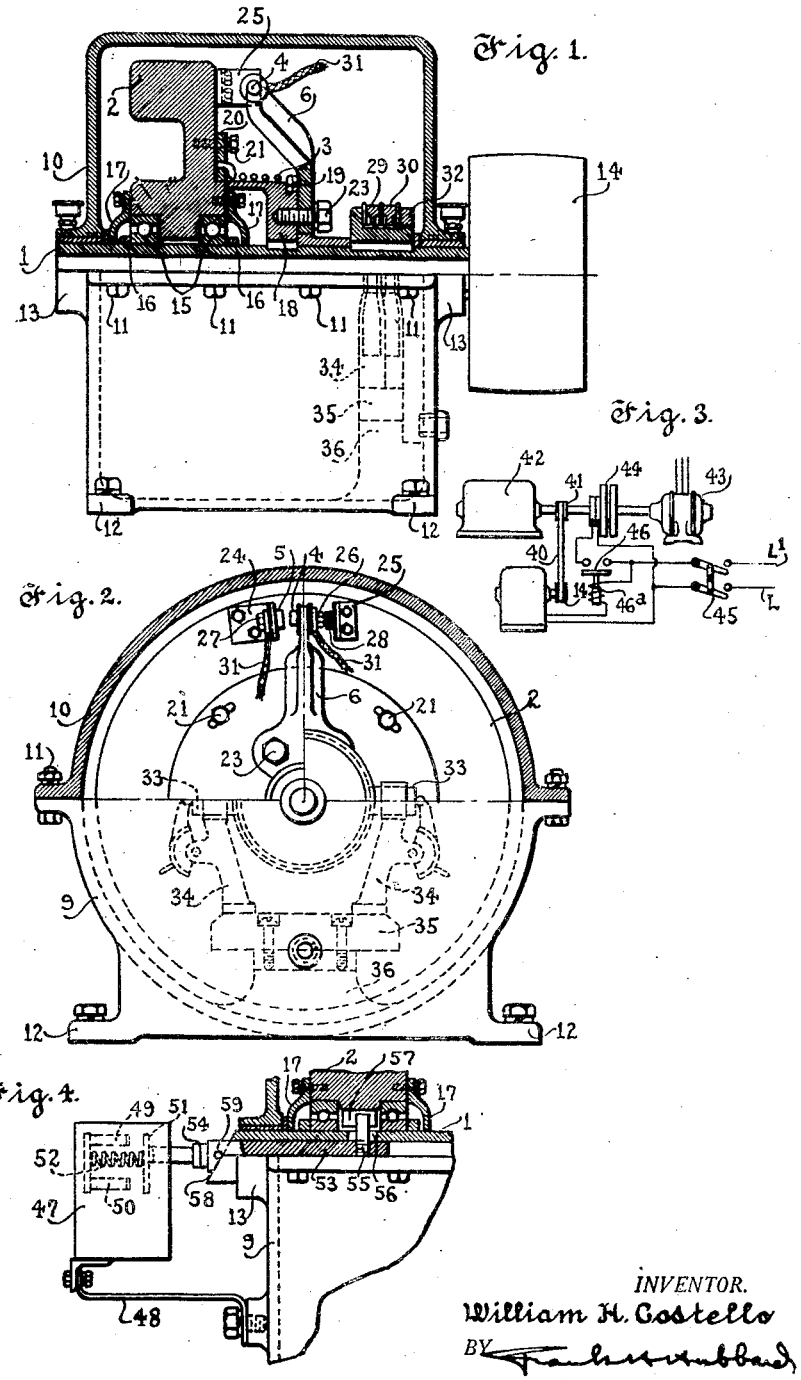
INVENTOR.
William H. Costello
BY
ATTORNEY

Patented Jan. 12, 1926.

1,569,651

UNITED STATES PATENT OFFICE.

WILLIAM H. COSTELLO, OF MILWAUKEE, WISCONSIN, ASSIGNOR TO THE CUTLER-HAMMER MFG. CO., OF MILWAUKEE, WISCONSIN, A CORPORATION OF WISCONSIN.

GOVERNING DEVICE.

Application filed September 1, 1921. Serial No. 497,770.

*To all whom it may concern:*

Be it known that I, WILLIAM H. COSTELLO, a citizen of the United States, residing at Milwaukee, in the county of Milwaukee and State of Wisconsin, have invented new and useful Improvements in Governing Devices, of which the following is a full, clear, concise, and exact description, reference being had to the accompanying drawing, forming a part of this specification.

This invention relates to governing devices and more particularly to devices for governing machines to control the rate of speed changes thereof.

In starting certain types of machines it is desirable to bring the same up to speed in a given period and to also maintain the rate of acceleration substantially uniform. Machines of this character are very often driven by motors which are inherently incapable of starting from rest under a load and it is the usual practice to maintain the motor in operation and to start the driven machine through the medium of a friction clutch. However, it is exceedingly difficult to control the action of the clutch so as to maintain the proper rate of acceleration of the driven machine and the present invention has among its objects to provide an automatic governing device which will start the driven machine in a given period and maintain the rate of acceleration thereof substantially uniform.

Another object is to provide a simple, compact and efficient governing device of the character above-stated which can be readily applied to existing drives without material modification thereof.

Various other objects and advantages of the invention will hereinafter appear.

The accompanying drawing illustrates certain embodiments of the governing device which will now be described, it being understood that the embodiments illustrated can be modified without departing from the scope of the appended claims.

In the drawing,

Figure 1 is a side view of a governing device embodying the invention, the upper half thereof being shown in section;

Fig. 2 is an end view of the governing device shown in Fig. 1, the upper half of the casing being shown in section;

Fig. 3 is a diagrammatic view of a typical installation embodying the governing device; and Fig. 4 is a fragmentary view partly in section of a modification of the controller shown in Fig. 1.

Referring to Fig. 1 the governor shown therein includes a tubular shaft 1 to be driven by the machine to be controlled, an inertia member comprising a fly wheel 2 which is rotatably mounted on said shaft and connected thereto through the medium of a helical spring 3 and a switch including co-operating contacts 4 and 5, the former contact being secured to an arm 6 which is fixed to shaft 1 and the latter being fixed to fly wheel 2. As hereinafter set forth contacts 4 and 5 control the energizing circuit of an electromagnetic clutch located between the driven machine and its driving motor and during acceleration of the driven machine the same intermittently establishes and interrupts the energizing circuit of the clutch to maintain the rate of acceleration of the machine substantially uniform.

More specifically the governor is provided with a cylindrical enclosing casing, including parts 9 and 10, said parts being secured together by bolts 11 and the former being provided with feet 12 for securing the same to a suitable support. The end walls of said casing are provided with bearings 13 for shaft 1 and the right hand end of said shaft projects beyond said casing and is provided with driving means such as pulley 14. Fly wheel 2 is designed so that the same has a relatively large moment of inertia and the hub thereof is counterbored at opposite ends to receive ball bearings 15. Ball bearings 15 are held against axial movement on shaft 1 by collars 16 which are threaded on said shaft and annular collars 17 are secured to opposite ends of the hub of fly wheel 2 for retaining grease around said bearings. Spring 3 is coiled about an annular supporting member 18 which is keyed to shaft 1 and the right hand end of said spring projects into an opening 19 in the outer face of said member, while the left hand end thereof projects into an opening in a spring plate 20, secured to fly wheel 2 by bolts 21. Spring 3 is held under tension to bias fly wheel 2 on shaft 1 in a direction wherein contacts 4 and 5 are normally held in engagement and as shown in Fig. 2 the bolt openings in plate 20 are slotted to permit adjustment of said plate with respect to said fly wheel for variation of the spring tension. Arm 6 is secured to supporting member 18 by bolts 23 and the outer end thereof projects between angle plates 24 and 25 secured to the right hand face of fly wheel 2. Contact 4 is secured to the outer end of arm 6 by a nut 26 and is insulated therefrom while contact 5 is secured to angle plate 24 by a nut 27 and is insulated from said plate. Angle plate 25 serves to limit movement of arm 6 in a clockwise direction with respect to fly wheel 2 and the same is provided with an insulating stop 28 to be engaged by nut 26. Contacts 4 and 5 are respectively connected to collector rings 29 and 30 by flexible leads 31. Said rings are mounted upon a sleeve 32 which is keyed to shaft 1, and each of the same is engaged by a brush 33 carried by a conventional type of brush holder 34. Brush holders 34 are arranged in opposed relation and are secured to an insulating base 35 which is fixed to a projection 36 in the bottom of casing member 9.

The function and operation of the aforedescribed governor will now be more fully set forth in connection with Fig. 3. Driving pulley 14 is connected by a belt 40 to a pulley 41 which is fixed to the shaft of driven machine 42 and power is transmitted to said machine from a motor 43 through the medium of an electromagnetic friction clutch 44. Power is supplied to clutch 44 from lines L and L' through the medium of a manually operated switch 45 and a normally open electromagnetic relay 46, the energizing winding 46$^a$ of said relay being controlled by contacts 4 and 5 of the aforedescribed governing device. Contacts 4 and 5 are normally held in engagement by spring 3 and assuming that motor 43 is in operation it is apparent that immediately upon closure of switch 45 relay 46 will respond to establish an energizing circuit for cultch 44. Energization of clutch 44 connects the driven machine 42 to the driving motor 43 and shaft 1 will then be driven at a speed proportional to the speed of the driven machine and will effect acceleration of fly wheel 2 through the medium of spring 3. Spring 3 is so adjusted that if the rate of acceleration of the driven machine exceeds a given value the lagging effect of fly wheel 2 will overcome the action of said spring and arm 6 will then move to the right to disengage contacts 4 and 5, such movement being limited by stop 26. Disengagement of contacts 4 and 5 de-energizes clutch 44 and the driven machine 42 will then coast until spring 3 accelerates fly wheel 2 to a speed corresponding substantially to the speed of the driven machine whereupon contacts 4 and 5 will re-engage to re-energize the clutch for further acceleration of the driven machine. Thus it is apparent that during acceleration of the driven machine the governing device will intermittently respond to maintain the rate of acceleration of the driven machine substantially uniform.

Referring to Fig. 4, the same illustrates a modification of the aforedescribed governing device wherein provision is made for controlling the clutch by means of a switch 47 without employing the collector rings and brushes shown in Fig. 1. Switch 47 is mounted upon a bracket 48 secured to the left hand wall of casing part 9 and the same is provided with stationary contacts 49 and 50 and a co-operating reciprocable contact member 51 biased to open position by a spring 52. Contact member 51 is operatively connected to a shaft 53 through the medium of a swivel connection 54 and said shaft is rotatable within shaft 1 and is provided with a pin 55 which projects outwardly through an enlarged opening 56 in shaft 1 into a keyway 57 in the hub of fly wheel 2. The left hand end of shaft 1 is provided with an inclined surface 58 and shaft 53 is provided with a projecting pin 59 for engaging said surface. When fly wheel 2 is in normal position with respect to shaft 1, spring 52 holds the pin 59 in the position shown in Fig. 4 but upon relative movement of fly wheel 2 with respect to shaft 1 said pin rides up inclined surface 58 on shaft 1 to move shaft 53 towards the left for closure of switch 47. Switch 47 will thus function in the same manner as the switch shown in Fig. 1.

What I claim as new and desire to secure by Letters Patent is:

1. The combination with a machine, of a clutch for transmitting power thereto and a governing device associated with said machine including a member to be driven by said machine, an inertia member which is normally held in a given relation with respect to said former member and is adapted to move relatively thereto upon a given change in the rate of acceleration of said driven machine, and control means for said clutch associated with said members.

2. The combination with a driven machine of an electromagnetic clutch for transmitting power thereto and a speed responsive device to be driven by said machine including relatively movable members, one to be driven by said machine and the other to be driven by said former member and being adapted to move with respect thereto upon a given increase in the rate of acceleration of said driven machine and means associated with said members for automatically controlling the action of said clutch to maintain the rate of acceleration of said driven machine substantially uniform.

3. The combination with a driven machine, of an electromagnetic clutch for transmitting power thereto and an acceleration governing device including an element to be driven at a speed proportional to the speed of said machine, an element movable with respect to said former element, a driving connection between said elements adapted to hold the same in a given relation and to permit relative movement of the latter with respect to the former upon a given change in the rate of acceleration of said machine and means associated with said elements for controlling the action of said clutch.

4. The combination with a machine of an electromagnetic acceleration regulator therefor, a governing device for said regulator including a shaft to be driven at a speed proportional to the speed of said machine, a fly wheel rotatably mounted on said shaft, an operative connection between said shaft and said fly wheel tending to normally hold the latter in a given relation with respect to the former and to permit relative movement of the latter with respect to the former upon given changes in the rate of acceleration of said machine, and a switch associated with said fly wheel and said shaft for controlling the energizing circuit of said acceleration regulating device.

In witness whereof, I have hereunto subscribed my name.

WILLIAM H. COSTELLO.